Figure 1:
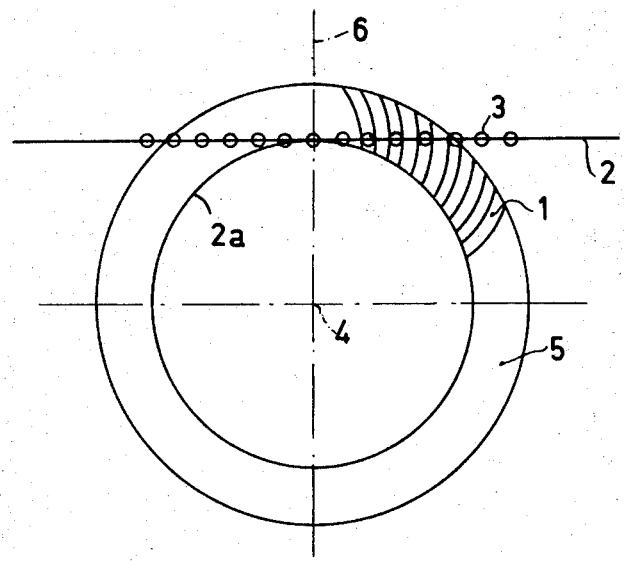

United States Patent

[11] 3,582,769

| [72] | Inventor | Klaus Brandenburg<br>Hamburg, Germany |
|---|---|---|
| [21] | Appl. No. | 14,721 |
| [22] | Filed | Feb. 24, 1970 |
| [45] | Patented | June 1, 1971 |
| [73] | Assignee | U.S. Philips Corporation<br>New York, N.Y. |
| [32] | Priority | Oct. 29, 1966 |
| [33] | | Germany |
| [31] | | P40,698 |
| | | Continuation of application Ser. No.<br>675,898, Oct. 17, 1967, now abandoned. |

[54] DEVICE FOR THE NON-CONTACT GAUGING THE DISPLACEMENT OF OBJECTS MOVED IN A STRAIGHT LINE
3 Claims, 10 Drawing Figs.

[52] U.S. Cl. .................................................. 324/34, 33/125
[51] Int. Cl. .................................................. G01r 33/00
[50] Field of Search ........................................ 324/34, 34 PS, 34 D; 33/125 C

[56] References Cited
UNITED STATES PATENTS

| 2,628,539 | 2/1953 | Neergaard.................. | 324/34 |
| 2,882,516 | 4/1959 | Neergaard.................. | 324/34 |
| 3,153,111 | 10/1964 | Barber et al. ............... | 33/125C |
| 3,295,214 | 1/1967 | Neergaard.................. | 33/125C |
| 2,628,539 | 2/1953 | Neergaard.................. | 324/34 |
| 2,882,519 | 4/1959 | Neergaard.................. | 324/34 |
| 3,153,111 | 10/1964 | Barber et al. ............... | 33/125C |
| 3,295,214 | 1/1967 | Neergaard.................. | 33/125C |

Primary Examiner—Rudolph V. Rolinec
Assistant Examiner—R. J. Corcoran
Attorney—Frank R. Trifari ABSTRACT: A device for noncontact gauging the linear displacement of an object includes a member having linearly spaced magnetic marks thereon whose centers lie along a straight line. A rotatable disc has uniformly spaced magnetic strips formed as involutes, the common evolute of which is a circle. The disc and member are relatively disposed such that the circle tangentially contacts a plane passing through the straight line connecting the centers of said marks. Measuring means is provided to determine the mark-strip-coincidence and thus provide a frequency signal with a phase related to a relative displacement.

INVENTOR.
KLAUS BRANDENBURG

INVENTOR.
KLAUS BRANDENBURG

INVENTOR.
KLAUS BRANDENBURG
BY
AGENT

DEVICE FOR THE NON-CONTACT GAUGING THE DISPLACEMENT OF OBJECTS MOVED IN A STRAIGHT LINE

This is a continuation of application Ser. No. 675,898 filed Oct. 17, 1967 and now abandoned.

The invention relates to a device for the noncontact gauging of the position and/or position variation of objects moved in a straight line by means of a rotating pickup device and a uniformly divided member which permits a digital representation of the measured value.

Arrangements employing rotating pickup discs are known per se. For example in German application 1187382 a device is described with which the position of a linear gauge is explored and indicated once per revolution by means of rotating spirals or screws. A drawback of this device is that the exploring of the measured value can be effected only once per revolution of the spiral or screw and—since for mechanical reasons the number of revolutions of the rotating spirals or screws can only be increased to a limited extent—a comparatively long time elapses consequently between two measured results.

A difficulty in this arrangement is further the manufacture and mounting of the gauge and spirals with the required accuracy.

Alternatively it is known to conduct the optical path of rays of a reproducing system through a corresponding gauge by means of rotating mirrors or prism wheels. In this case a part of the light of a filament lamp is thrown on a linear gauge through a constantly rotating reflecting prism wheel, the gauge is reproduced on itself, and an electric signal is derived from the relative position of the image and the gauge through a photoelectric cell. At the same time the other part of the light is thrown on a short reference gauge and a second output signal is recovered in the same manner. Since the prism wheel rotates constantly, two alternating voltages are formed which in the case of a stationary gauge have the same frequency and a given phase position relative to each other. If the gauge is moved relative to the exploring device, the phase position of the alternating voltages is varied, namely by each time 360°, when the gauge is moved through half a pitch.

In known manner information about the position of the gauge and the variation of the position, respectively, can be obtained in coarse steps corresponding to half the gauge pitch and likewise in known manner in finer steps by more accurate determination of the phase position, for example, by counting time pulses, the recurrence frequency of which has a given ratio to the frequency of the alternating voltages.

In this arrangement the measured value is picked-up as often per revolution of the prism wheel as the wheel has reflecting surfaces. In many cases, however, optical exploration is undesirable for reasons of measuring security. In addition, the combination of glass gauges with metals of which the measuring objects (for example, machine tools) consist, presents some problems.

Inductive or capacitive exploration of the position of the gauge permits the use of metal gauges which may have essential advantages.

It is the object of the invention to explore, preferably inductively, a member with linearly placed marks thereon several times per revolution while avoiding the above drawbacks by means of a rotating pickup disc. According to the invention this is achieved in that the disc comprises strips, which are uniformly distributed in an annularly shaped band on the outer edge of the disc are preferably magnetically conductive, in the form of involutes the common evolute of which the inner circumference of the band, the inner circumference of the band tangentially contacting a plane passing through the straight line connecting the centers of said marks, which marks likewise are preferably magnetically conductive.

Such a device permits of picking-up the measured value, that is to say the position of the member, per revolution so often as involutes are divided on the circumference of the pickup disc. For this purpose no further means as, for example, the reproducing optical device of a photoelectric pickup system, are required but the position of the involutes to the marks of the member can be picked up in a simple manner by means of an induction coil in a magnetic system. In contrast with the arrangements employing spirals or screws the multiplication of the number of pickup positions per revolution of the pickup disc is achieved without the distance between the individual involutes becoming too small. For example, if the linearly marked member has a pitch of 1 mm., the distance also of the involutes is 1 mm. On the contrary, the distance between the individual threads of a multithreaded screw with which likewise an $n$-fold exploration per revolution could be achieved, would be $1/n$ mm., where $n$ is the number of threads. Such small distances are not desirable neither from a point of view of manufacture, nor electrically (for example due to the leakage flux).

As compared with devices in which instead of rotating discs electric travelling fields are produced and likewise the phase position of two alternating voltages dependent upon the gauge position is evaluated, the device according to the invention has the advantage that only the durations of a cycle of the produced alternating voltages, and not their amplitudes or amplitude ratios, contribute to the measured result and consequently deviations from the sine form produce no measuring errors. This is of advantage in connection with manufacturing tolerances.

Figure 2:
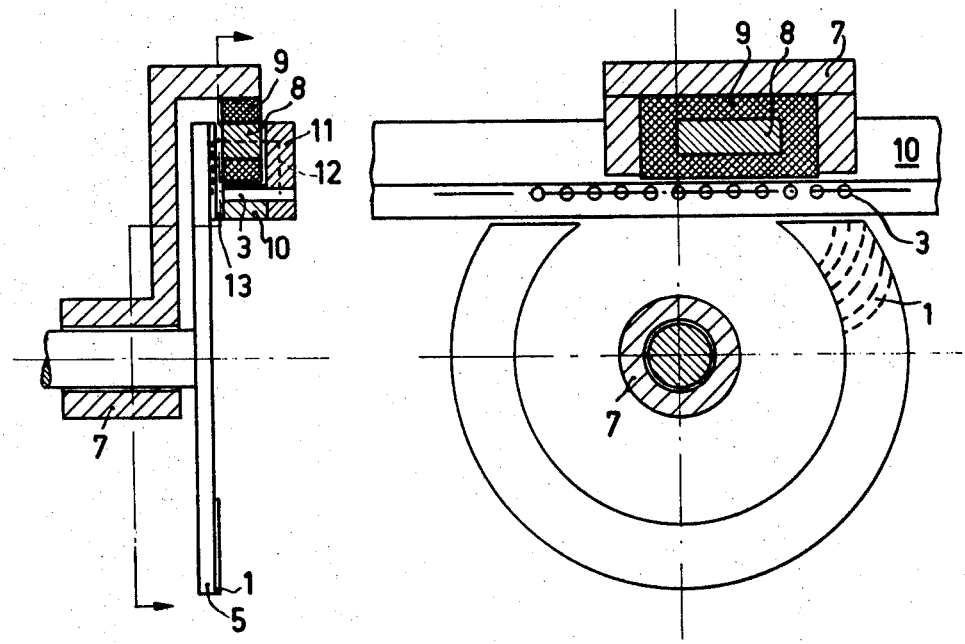
Figure 3A:
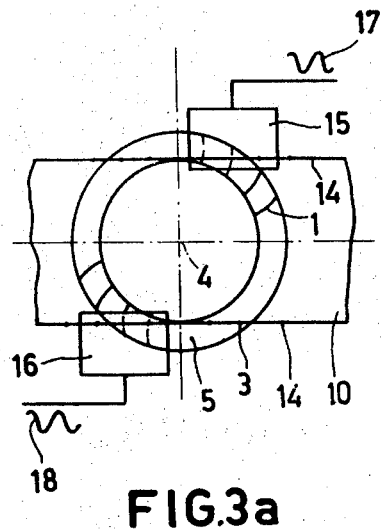
Figure 3B:
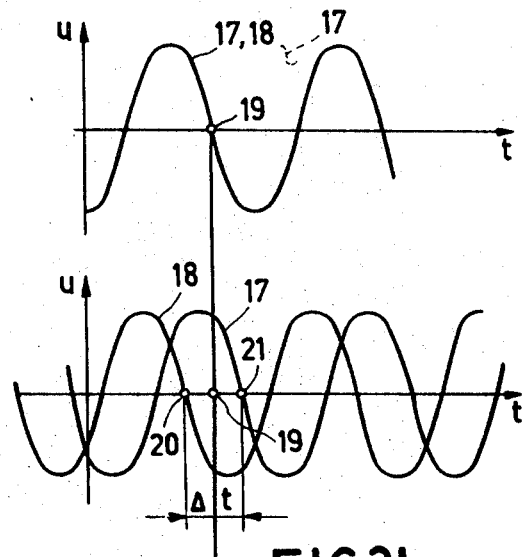
Figure 4A:
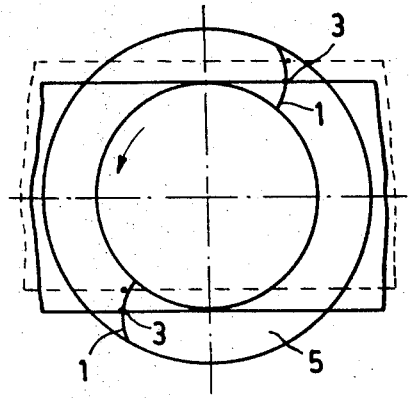
Figure 4B:
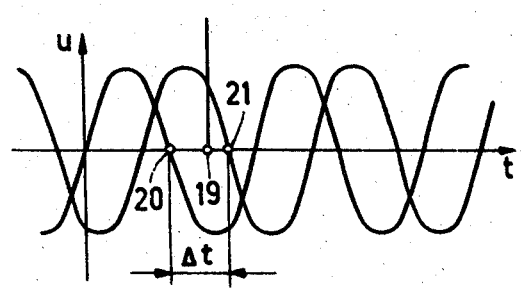

In order that the invention may readily be carried into effect it will now be described in greater detail, by way of example, with reference to the accompanying drawings, in which FIG. 1 diagrammatically shows a pickup disc and the associated member according to the invention, FIG. 2 shows an example for inductive picking-up of the relative position of the member and the pickup disc, FIGS. 3a and 3b diagrammatically shows the generation and evaluation of the alternating voltages in a device comprising two inductive pickup coils, FIGS. 4a and 4b show the influence of variations of the relative position between the member and the pickup device at right angles to the direction of measurement, FIGS. 5a, 5b, 6a and 6b show the elimination of errors from an eccentric arrangement of the pickup disc.

The strips (FIG. 1) which are preferably magnetically conductive are formed in an annular shaped band and are involutes of the common evolute which is a circle 2a tangentially contacting a plane passing through the straight line 2 connecting the centers of spaced reference marks 3 of the member. The strips 1 positioned on the outer edges of pickup disc 5 rotate about the center 4 of the disc 5 supporting the strips. When the disc is rotated, the strips 1 in the semicircular area of disc 5 situated on the right-hand side of the line 6 will repeatedly intercept a reference mark 3 of the member after rotating through identical angles of rotation.

An electric signal may be derived in known manner from the relative position between the pickup disc and the marks on the member, namely so that when the member is stationary and the disc rotates constantly an alternating voltage is generated having a period equal to the time which the involutes 1 require to travel from one mark 3 on the member to the next. When the member 2 is moved in the longitudinal direction relative to the pickup disc, the frequency of the produced alternating voltage is varied towards higher or lower values according to the direction of movement. The phase shift resulting from this may be measured and evaluated in known manner, for example, relative to a fixed frequency which is independent of the movement of the member.

FIG. 2 shows an embodiment of an inductive pickup device. The disc 5 with the magnetically conductive strips 1 is rotatably journaled in a stand 7. The disc is driven constantly, for example, by an electric motor so that the strips 1 travel along the marks 3 of the member 10. Moreover a permanent magnet 8 which is surrounded by a coil 9 is secured to the stand 7. The marks 3 of the member are likewise magnetically conductive and are incorporated in the magnetic circuit denoted by the line 12 through the part 11 of the pickup device. By suitable construction of the circuit it can easily be achieved that when the disc 5 is rotated only the magnetic resistance in the airgap 13 is modulated dependent upon the relative position between the involute strips 1 and the marks 3 of the member. Therefore an alternating voltage is induced in the coil 9 the phase position of which is a measure of the position of the member relative to the pickup disc.

In addition to the diagrammatic device for generating the alternating voltage, other pickup devices, in particular noninductive pickup devices, are also possible. For example, dependent upon the relative position of the marks of the member to the involutes, a signal may be derived by capacitive, optic, or mechanical pickup.

FIGS. 3a shows a device with which the position of the member can be derived from the phase position of the generated alternating voltages without a reference signal and which is independent of the member position. For this purpose the member 10 comprises two rows 14 of marks 3 of the member which are rigidly arranged parallel to each other with equal pitches and in front of which the disc 5 with involute strips 1 rotates constantly. Two pickup devices 15 and 16, for example, magnet coil systems as shown in FIG. 2, are rigidly secured to the stand symmetrically to the center 4 of the disc 5, the disc 5 rotating in said stand. The alternating voltages !17 and 18 are generated in the pickup devices 15, 16.

FIG. 3b explains the dependency of the phase position of these voltages on the member position. At a given position of the member the two alternating voltages 17 and 18 are in phase and intersect the zero line at the common point 19. When the member is moved to a different position, the voltages move relative to each other since owing to the arrangement of the pickup devices 15 and 16 in the case of a movement of the member 10, the frequency 17 is increased and the frequency 18 decreased, or conversely, in accordance with the direction of movement of the member. The phase shift will be 360° when the member is moved half a pitch. As in the known devices, information regarding the position variation of the gauge in steps of half a pitch can be obtained therefrom. More precise information is obtained by more more accurate determination of the phase position by determining in likewise known manner the period $\Delta t$ or its variation relative to the preceding exploration period between the two passages through zero 20 and 21 occurring in the same sense.

FIGS. 4a and 4b show that by the arrangement of two pickup devices 15, 16 as shown in FIG. 3a, the influence of movements of the pickup disc at right angles to the direction of measurement can be made inoperative which is very important, for example, with respect to the mounting tolerance of the member in a machine. FIG. 4a shows two involutes 1 which each coincide with a mark 3 of the member when the member is in its set position. When the member is moved at right angles to its longitudinal direction (position shown in broken lines) the marks and involutes no longer coincide; as long as the transverse movement is small enough, the two involutes can be made to coincide approximately simultaneously by rotating the disc 5 in the direction opposite to that of the arrow. The same also holds good for the remaining coincidences of involutes and marks of the member which are not shown.

For this reason the two alternating voltages will lead or lag in their phase position in the case of a transverse movement by the same amounts as shown in FIGS. 4b, without the period $\Delta t$ between the passages through zero 20 and 21 being influenced.

Figure 5A:
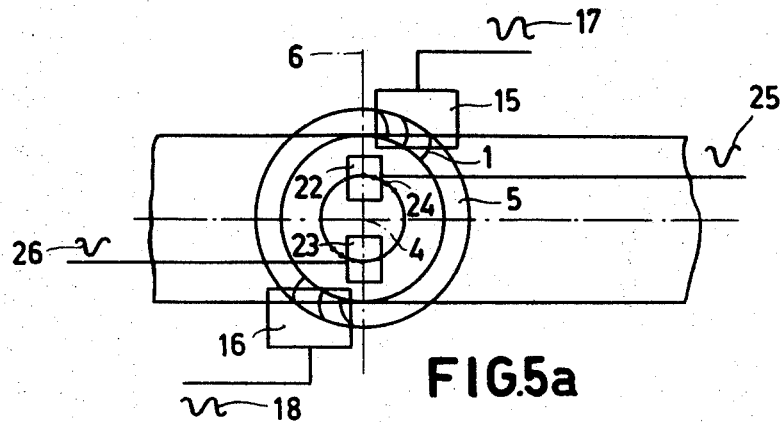
Figure 5B:
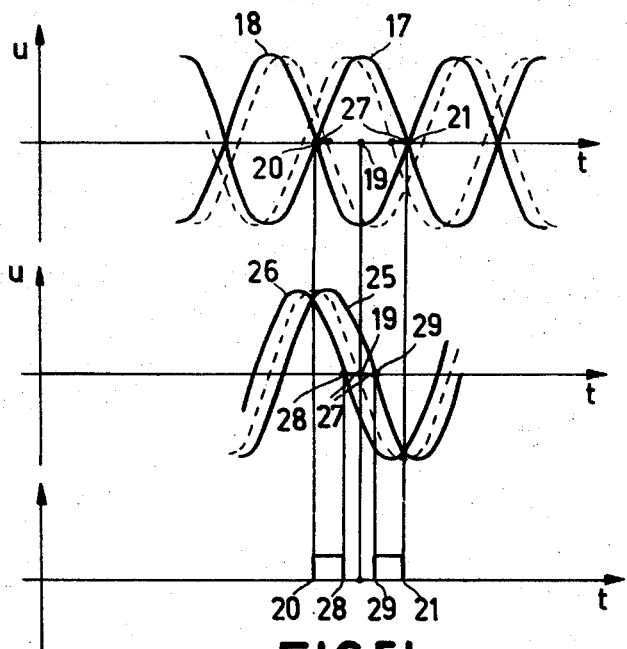

As a further source of errors in determining the position of the member 10 is to be considered an eccentric journaling of the disc 5 supporting the involutes to the point of rotation 4. FIGS. 5a and 5b show how errors resulting therefrom can be eliminated. In FIG. 5a two further systems 22 and 23 are rigidly secured to the pickup devices 15 and 16 described. These may be, for example, inductive systems of a known type. While the pickup devices 15 and 16 explore the position of the marks 3 of the member, the systems 22 and 23 only explore the angular position of the disc 5. For this purpose the pitch marks 24 on the disc 5 are arranged concentrically to the involute strips 1 at equal distances and with the same pitch angles as the involutes 1. They are, for example, magnetically conductive and constructed so that on rotating the disc 5 alternating voltages 25 and 26 are generated in the pickup devices 22 and 23.

When the involutes 1 on the disc 5 travel eccentrically to the center 4, the voltages 17 and 18 obtain an additional phase shift 27, dependent upon the angular position of the disc 5, with respect to its set position corresponding to a certain gauge pitch, which position is shown in FIG. 5b in broken lines. When the pickup devices 22 and 23 are arranged approximately symmetrically to the center 4, for example, on the line 6 the alternating voltages 25 and 26 generated therein also deviate from their set position by the same amount 27 and no longer intersect the zero line in common in the point 19. Since the phase shifts of the voltages 17 and 25 as well as that of the voltages 18 and 26, are approximately the same according to amount and sign, the error a resulting from an eccentric journaling of the pickup disc 5 may be made inoperative.

It is shown in FIG. 5b how the phase shift of the alternating voltage corresponding to the member position can be obtained, because no longer the total time duration between the passages through zero 20, 21 of the voltages !7 and 18 of the same sense is determined as a measure of the member position, but the time between the passages through zero 28 and 29 of the voltages 25 and 26 in the same sense remains out of consideration in that, for example, between the instants 20 and 28 time pulses for determining the phase position are counted in known manner, counting is interrupted between the lines 28 and 29, and is started again from the instant 29 up to the instant 21.

Figure 6A:
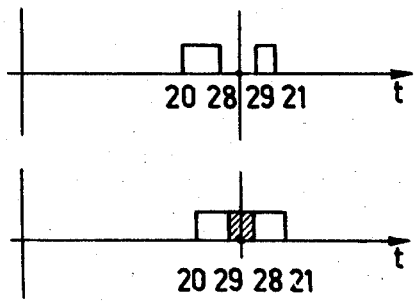

FIG. 6a finally shows that superposition of eccentricity of the disc 5 to the center 4 and transverse movement does not vary the error elimination.

Figure 6B:
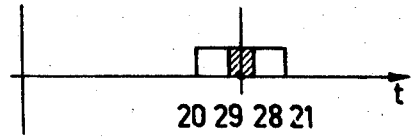

FIG. 6b shows that in case of a change of the instants 28 and 29 counting between these points may not be interrupted but that there must be counted in known manner either with double frequency, or pulses of the original frequency must be supplied to a counter with the double value.

With the device described it is thus possible, without essential influence by mounting tolerances, to reproduce digitally by known electronic means the position of an object which is moved linearly.

I claim:

1. A device for determining without contact incremental position variation of objects moved in a straight line comprising a member for attachment to said objects having thereon a plurality of spaced reference marks positioned linearly thereon and uniformly dividing said member into lengths of measurement, a disc having strips formed in an annular shaped band on the outer edge of the disc, said strips being involutes the common evolute of which is the inner circumference of the band, said disc being positioned adjacent said member and mounted for rotation relative to said member such that the inner circumference of said band tangentially contacts a plane passing through a straight line connecting the centers of said spaced reference marks, means to rotate the disc and move the strips relative to the reference marks, and means mounted adjacent said disc and member and responsive to the position of said reference marks relative to said strips to produce a signal the phase of which changes upon movement of said member, whose movement represents position variations of said object.

2. A device as claimed in claim 1 wherein the strips are magnetically conductive and form when coincident with said reference marks a magnetic path, and said signal-producing means is a coil and magnet positioned in said magnet path.

3. A device as claimed in claim 2 wherein the member has two parallel rows of equidistant reference marks arranged symmetrically with respect to the center of the disc.

UNITED STATES PATENT OFFICE
CERTIFICATE OF CORRECTION

Patent No. 3,582,769        Dated June 1, 1971

Inventor(s) KLAUS BRANDENBURG

It is certified that error appears in the above-identified patent and that said Letters Patent are hereby corrected as shown below:

Column 1, line 66, after "disc" insert --and-- line 67, after "which" insert --is--

Column 2, line 43, after "strips" insert --1--

Column 3, line 40, change "gauge" to --member-- line 41, delete one "more".

Signed and sealed this 12th day of October 1971.

(SEAL)
Attest:

EDWARD M. FLETCHER, JR.        ROBERT GOTTSCHALK
Attesting Officer        Acting Commissioner of Patents